United States Patent [19]
Yamaguchi et al.

[11] Patent Number: 5,703,325
[45] Date of Patent: Dec. 30, 1997

[54] WATERPROOF CASING

[75] Inventors: Tohru Yamaguchi; Hiroaki Kamo, both of Shizuoka, Japan

[73] Assignee: Yazaki Corporation, Tokyo, Japan

[21] Appl. No.: 602,030

[22] Filed: Feb. 15, 1996

[30] Foreign Application Priority Data

Feb. 16, 1995 [JP] Japan .................. 7-028268
Feb. 9, 1996 [JP] Japan .................. 8-024061

[51] Int. Cl.⁶ .................................................. H02G 3/08
[52] U.S. Cl. ................................. 174/50; 220/804
[58] Field of Search .................... 174/50, 50.5, 52.1; 220/3.8, 3.9, 796, 804, 4.21

[56] References Cited

U.S. PATENT DOCUMENTS

| | | | |
|---|---|---|---|
| 4,654,470 | 3/1987 | Feldman et al. | 174/50 |
| 4,871,884 | 10/1989 | Hayashi | 174/52.1 |
| 5,310,075 | 5/1994 | Wyler | 220/355 |
| 5,531,345 | 7/1996 | Nakamura et al. | 220/3.8 |

FOREIGN PATENT DOCUMENTS

| | | | |
|---|---|---|---|
| 55-129479 | 9/1980 | Japan | H05K 5/06 |
| 1-105323 | 7/1989 | Japan | H02G 3/14 |
| 1-135783 | 9/1989 | Japan | H05K 5/06 |
| 3-109383 | 11/1991 | Japan | H05K 5/06 |
| 5-9121 | 2/1993 | Japan | H02C 3/08 |

*Primary Examiner*—Kristine L. Kincaid
*Assistant Examiner*—Joseph Waks
*Attorney, Agent, or Firm*—Sughrue, Mion, Zinn, Macpeak & Seas, PLLC

[57] ABSTRACT

A waterproof casing including a casing body which has a substantial box-shape and a lid which openably closes an open portion of the casing body. The casing body end the lid include respective first peripheral walls butted against each other to thereby prevent the intrusion of water into a receiving space for electrical parts, and also include respective second peripheral walls which are spaced outwardly from the first peripheral walls to form a space around the first peripheral walls, and are butted against each other, so that each of the joint portion between the first peripheral walls and the joint portion between the second peripheral walls forms a waterproof structure which limits the intrusion of water. The two joint portions are offset from each other in a vertical direction, and drain holes are formed through a bottom portion of the second peripheral wall of the casing body so as to reduce the pressure of a high-pressure water stream within the space and also to discharge the water from the space.

8 Claims, 9 Drawing Sheets

WATERPROOF CASING

BACKGROUND OF THE INVENTION

1. Field of the Invention

This invention relates to a waterproof casing suited for use, for example, as an electric junction box which contains electrical parts such as a fuse and a relay, and is mounted in an engine room of an automobile.

2. Description of the Related Art

Figure 9:
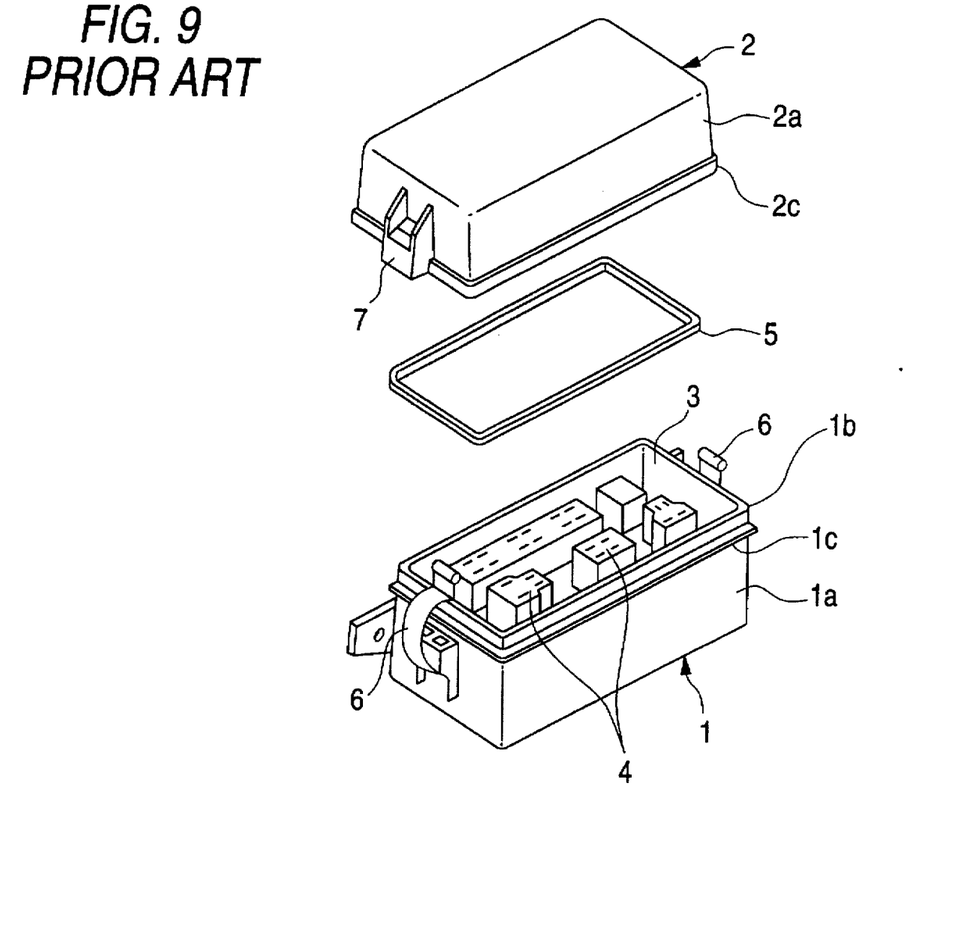
FIG. 9 is an exploded, perspective view of a conventional waterproof casing.
Figure 10:
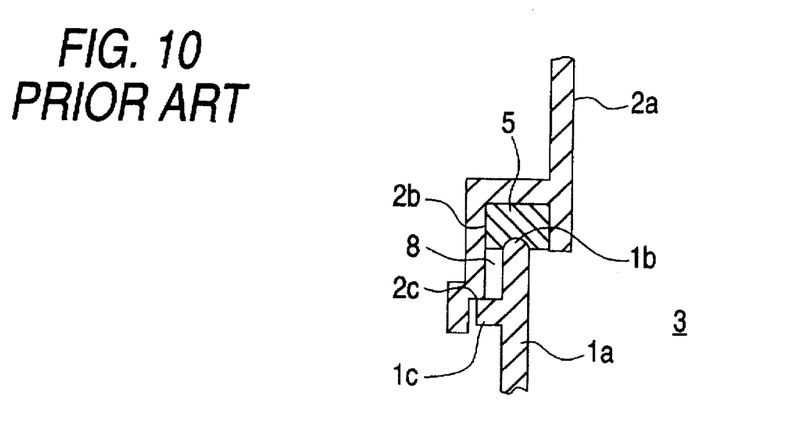
FIG. 10 is a cross-sectional view showing a waterproof structure for a joint portion between a casing body and e lid of the casing of FIG. 9.
Figure 11:
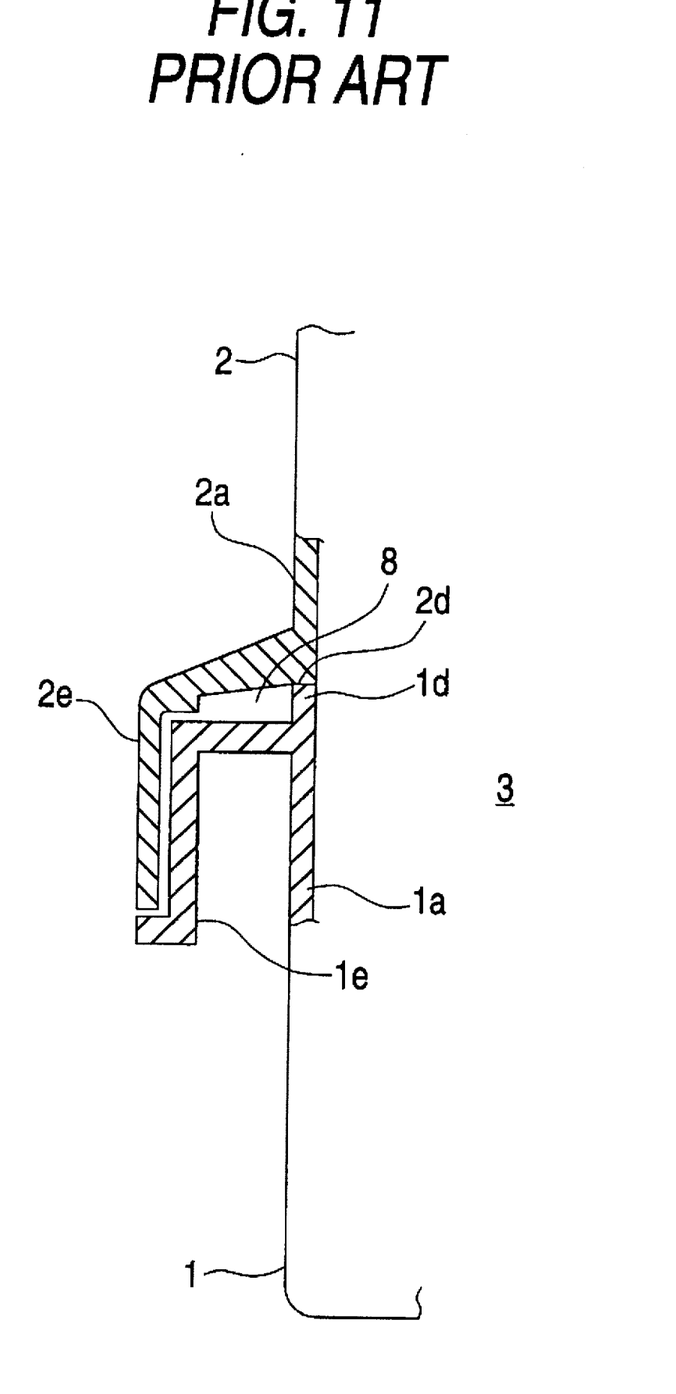
FIG. 11 is a cross-sectional view showing another example of waterproof structure in the conventional waterproof casing.
Figure 12:
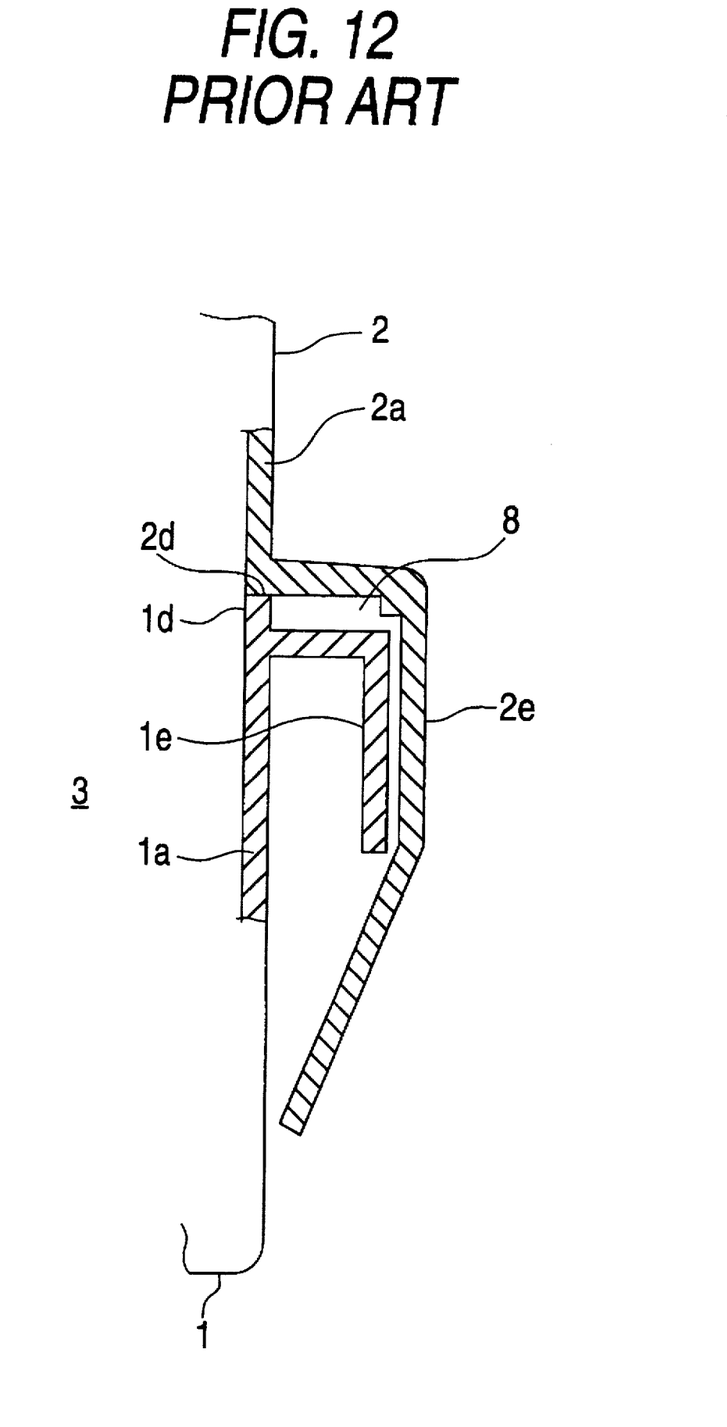
FIG. 12 is a cross-sectional view showing a further example of waterproof structure in the conventional waterproof casing.

For mounting electrical parts, such as a fuse, a relay and a connector for a wire harness, in an engine room of an automobile, a waterproof casing is used in order to prevent these electrical parts from being stained and damaged by rain water droplets. One conventional waterproof casing used for this purpose is shown in FIGS. 9 to 12. FIG. 9 is an exploded, perspective view of the conventional waterproof casing, FIG. 10 is a cross-sectional view showing a waterproof structure for a joint portion between a casing body and a lid of the casing of FIG. 9, FIG. 11 is a cross-sectional view showing another example of waterproof structure in the conventional waterproof casing, and FIG. 12 is a cross-sectional view showing a further example of waterproof structure in the conventional waterproof casing.

The waterproof casing shown in FIG. 9 comprises a casing body 1 having a substantial box-shape, and a lid 2 for openably closing an open portion of the casing body 1. The casing body 1 and the lid 2 jointly define a receiving space 3 for holding or containing electric parts 4 and the like. Distal ends of peripheral walls 1a and 2a of the casing body 1 and the lid 2 are butted against each other to provide a joint portion which is waterproof, thereby preventing water from intruding into the receiving-space 3. In this case, a packing 5 made of synthetic rubber or the like is provided at the joint portion between the peripheral walls 1a and 2a, thereby achieving a waterproof effect.

As shown in FIG. 10, a groove portion 2b for receiving the packing 5, as well as a bent portion 2c for overlapping the outer surface of the distal end portion of the peripheral wall 1a, is formed at the distal end portion of the peripheral wall 2a of the lid 2. A packing urging portion 1b for being pressed against the packing 5 to enhance the waterproof effect, as well as a flange 1c extending in a direction of the thickness of the peripheral wall 1a for engagement with the bent portion 2c, is formed at the distal end portion of the peripheral wall 1a.

In the waterproof casing shown in FIGS. 9 and 10, when the distal ends of the peripheral walls 1a and 2a of the casing body 1 and the lid 2 are butted against each other, the flange 1c abuts against the bent portion 2c, and also the packing urging portion 1b is pressed against the packing 5, thus forming the double waterproof structure. A liquid-collecting space 8 is formed between the two waterproof structures, and this space 8 serves to prevent water, intruded through the outer waterproof portion, from penetrating through the inner waterproof portion by a capillary action.

The casing body 1 and the lid 2, butted against each other at their peripheral walls 1a and 2a, are kept joined together by engaging distal ends of leaf-spring-like lock pieces 6, which are formed on the casing body 1, respectively with locking step portions 7 formed on the lid 2.

FIGS. 11 and 12 show other waterproof structures, respectively, in which no packing is used, and it is intended to obtain a desired waterproof effect only by means of bent distal end portions of peripheral walls 1a and 2a of a casing body 1 and a lid 2.

2

In either of these structures, a projected edge portion 1d for abutting against the distal end of the peripheral wall 2a of the lid 2 is formed at the distal end of the peripheral wall 1a of the casing body 1, and a flange 1e having a substantially L-shaped cross-section extends from that portion of the distal end portion of the peripheral wall 1a disposed adjacent to the projected edge portion 1d. An intimate contact surface 2d against which the projected edge portion 1d can abut is formed at the distal end of the peripheral wall 2a of the lid 2, and a joint covering portion 2e for covering the outer side of the flange 1e extends from that portion of the peripheral wall 2a disposed adjacent to the intimate contact surface 2d. The flange 1e and the joint covering portion 2e overlap each other at their distal ends, with a very small gap formed therebetween, so that water can not easily intrude therebetween. A liquid-collecting space 8 is formed between proximal end portions of the flange 1e and the joint covering portion 2e, and this space 8 serves to prevent water, intruded through the very small gap between the distal end portions by a capillary action or by a pressure of blown water droplets, from reaching the area of contact between the projected edge portion 1d and the intimate contact surface 2d.

As described above, in either of the waterproof structures shown respectively in FIGS. 11 and 12, the distal ends of the flange 1e and the joint-covering portion 2e, which are disposed in close proximity to each other, function as a first waterproof structure. The intimate contact between the projected edge portion 1d and the intimate contact surface 2d achieves the function of a second waterproof structure, thereby limiting the intrusion of water into a receiving space 3 (see Japanese Utility Model Unexamined Publication No. Sho. 55-129479).

In each of the above-mentioned waterproof casings, the double waterproof construction is provided by the first and second waterproof structures, and the liquid-collecting space 8 is formed between the first and second waterproof structures. However, when a water stream of high pressure is applied to the first waterproof structure, it is difficult to secure a satisfactory waterproof effect.

More specifically, if a water stream of high pressure is applied to the outer first waterproof structure, so that the water passes through the first waterproof structure to reach the liquid-collecting space 8 because of the high pressure, the water thus once collected in the liquid-collecting space 8 can not be easily discharged therefrom since the capacity of the liquid-collecting space 8 is relatively small. Therefore, the liquid-collecting space 8 is kept at a humid atmosphere over a prolonged period of time, and this humid atmosphere enters the receiving space 3 through a microscopic gap in the second waterproof structure, resulting in a problem that the atmosphere in the receiving space 3 is contaminated into a humid condition.

Besides, when water intrudes into the liquid-collecting space 8, the water can be prevented from being led into the second waterproof structure by a capillary action, but the liquid-collecting space 8 is soon filled with the water since its capacity is small. This results in a problem that a high pressure of the external water acts directly on the inner waterproof structure, so that the double waterproof structure can not sufficiently achieve its purpose.

SUMMARY OF THE INVENTION

It is an object of this invention to overcome the above problems, and more specifically to provide a waterproof casing in which even if a water stream of high pressure acts on a joint portion, the water is positively prevented from intruding into a receiving space, thereby preventing electrical parts, received therein, from being obtained and damaged by the water.

In attaining the above object, the invention provides a waterproof casing comprising: a casing body having a substantial box-shape; and a lid for openably closing an open portion of the casing body, the casing body and the lid jointly defining a receiving space for containing electrical parts, wherein the casing body and the lid include respective first peripheral walls which are butted against each other to thereby prevent an intrusion of water into the receiving space, and also include respective second peripheral walls which are spaced outwardly from the first peripheral walls to form a space around the first peripheral walls, and are butted against each other, so that each of a joint portion between the first peripheral walls and a joint portion between the second peripheral walls forms a waterproof structure which limits an intrusion of water.

DETAILED DESCRIPTION OF THE PREFERRED EMBODIMENTS

Figure 1:
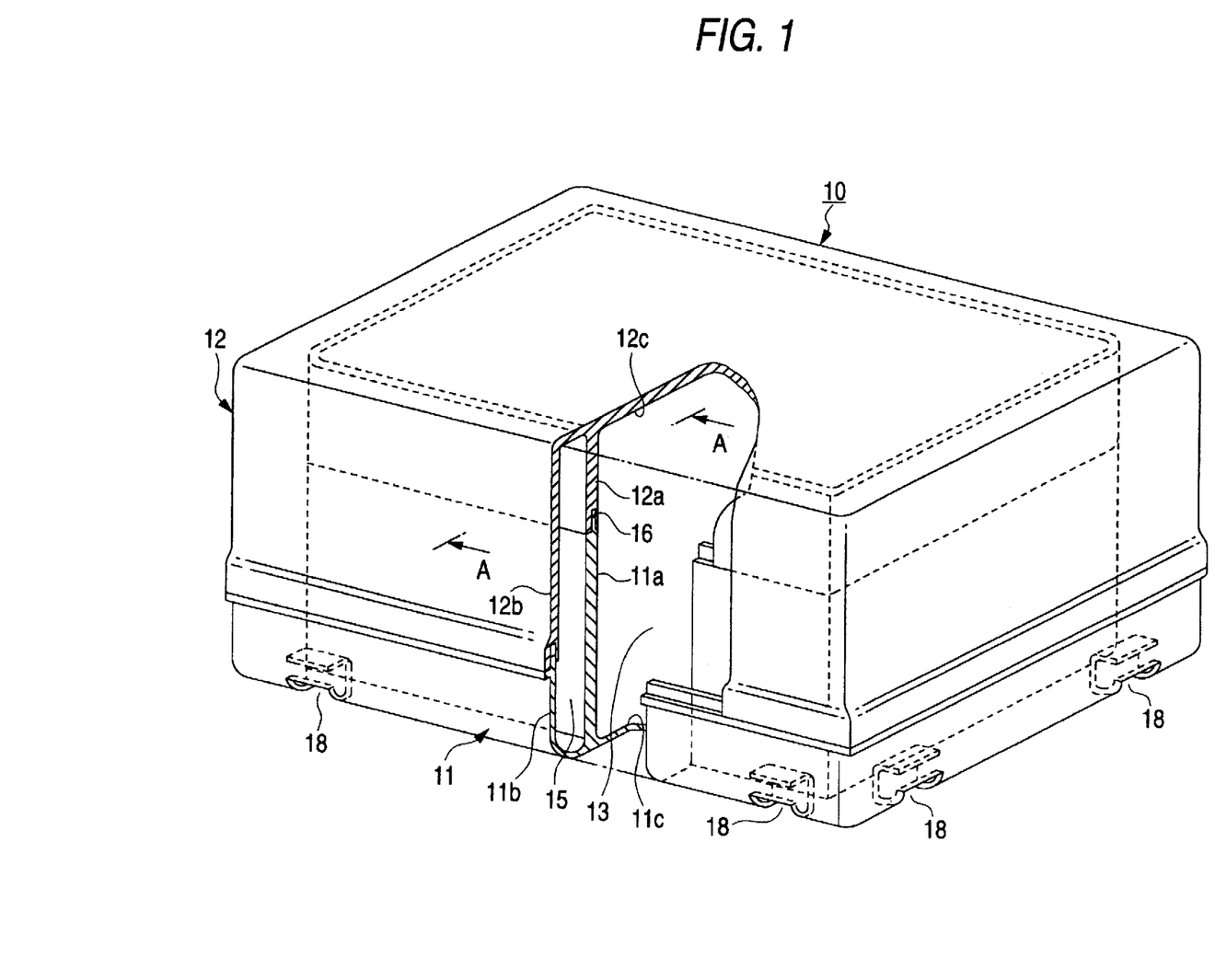
FIG. 1 is a partly-broken, perspective view of a first embodiment of a waterproof casing of the present invention.
Figure 2:
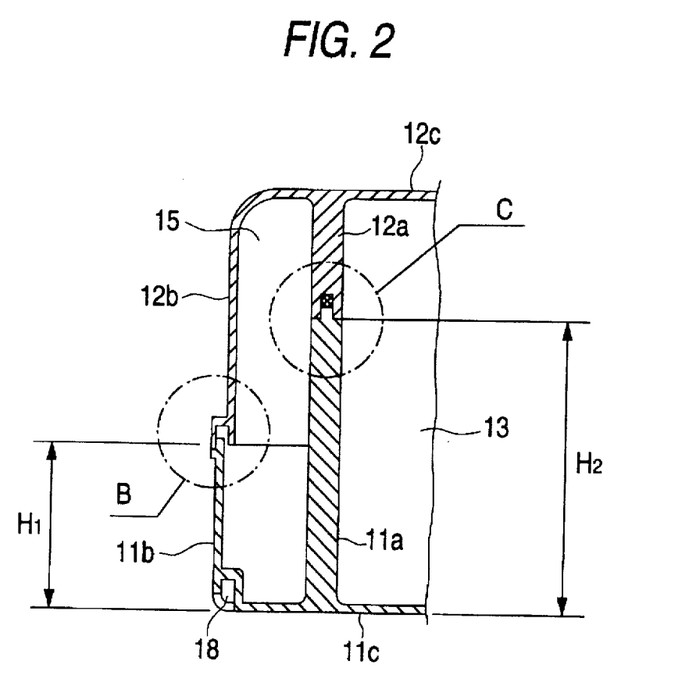
FIG. 2 is a cross-sectional view taken along line A—A indicated in FIG. 1.
Figure 3:
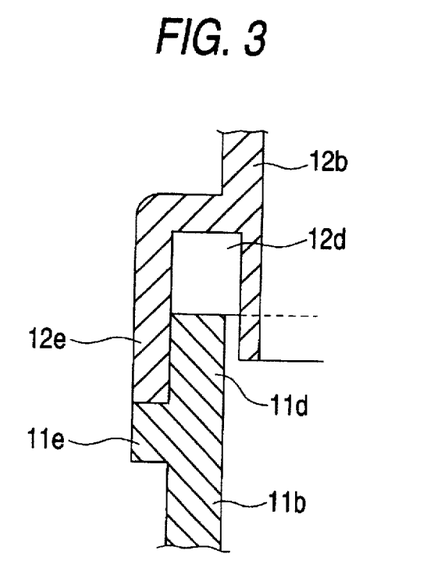
FIG. 3 is an enlarged view of a portion B indicated in FIG. 2.
Figure 4:
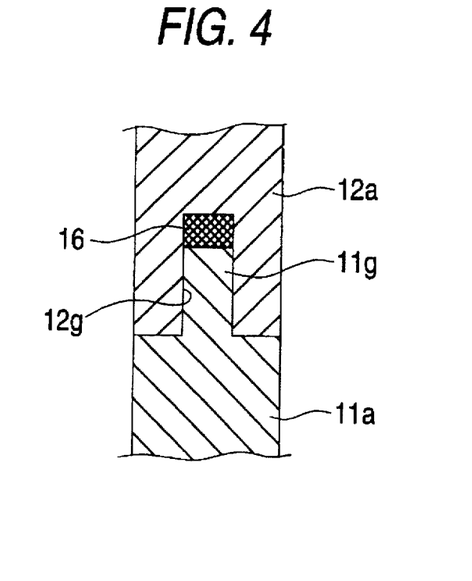
FIG. 4 is an enlarged view of a portion C indicated in FIG. 2.
Figure 5:
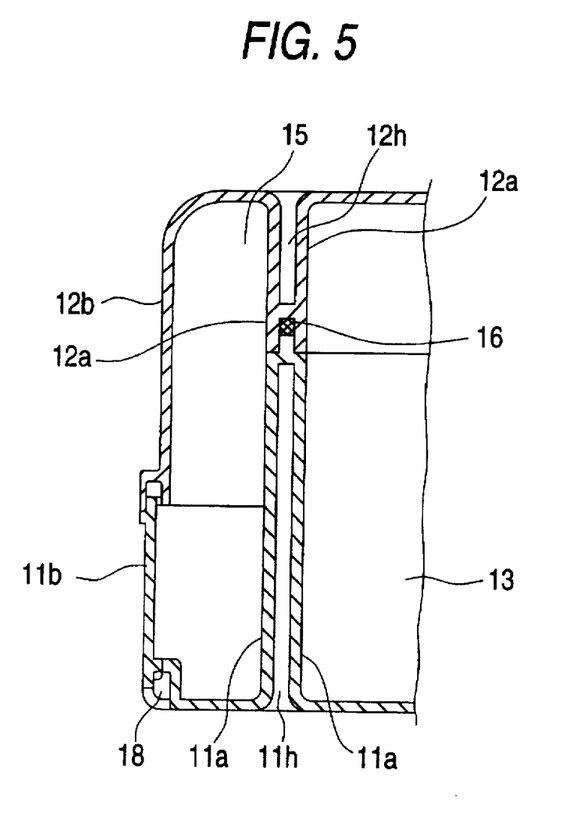
FIG. 5 is a cross-sectional view of a portion of a second embodiment of the waterproof casing of the invention.
Figure 6:
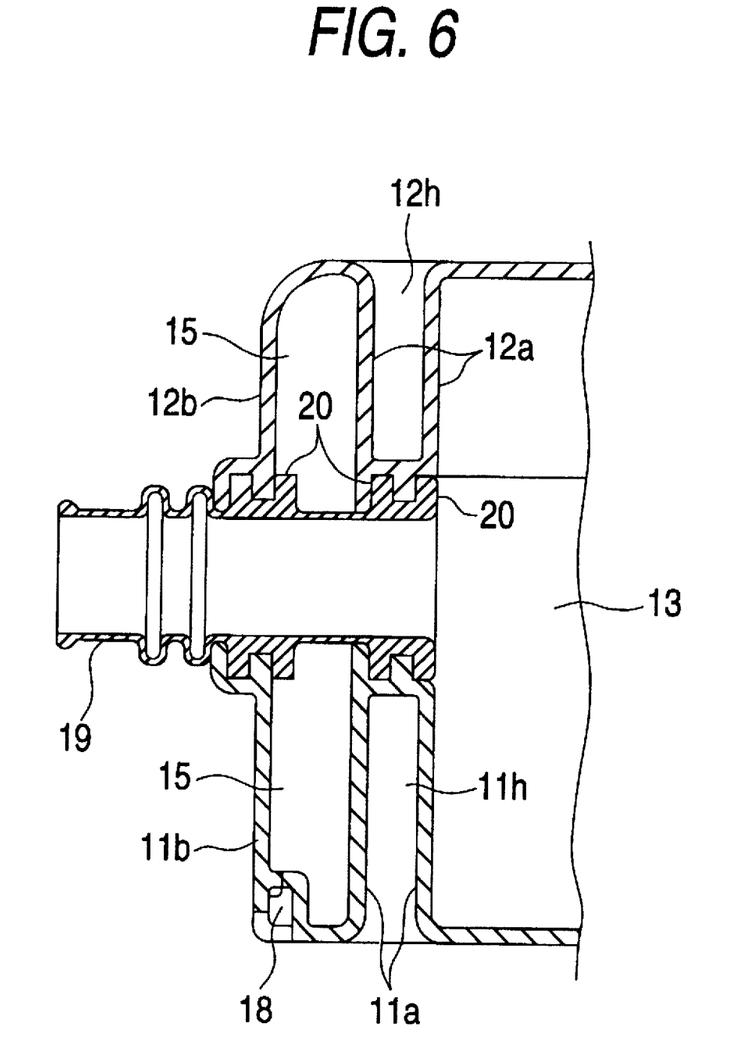
FIG. 6 is a cross-sectional view of a portion of a third embodiment of the invention.
Figure 7:
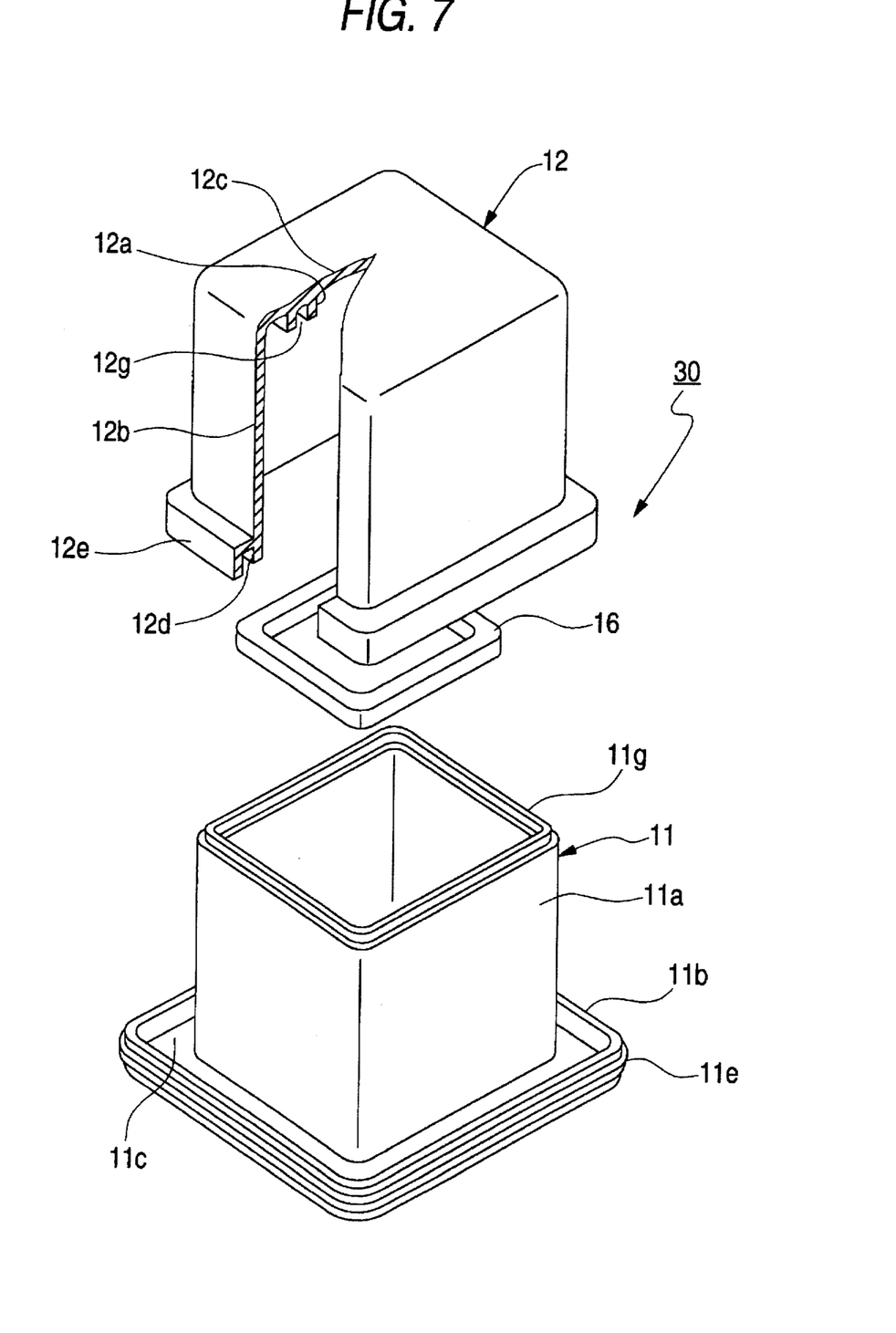
FIG. 7 is a partly-broken, exploded perspective view of a fourth embodiment of the invention.
Figure 8:
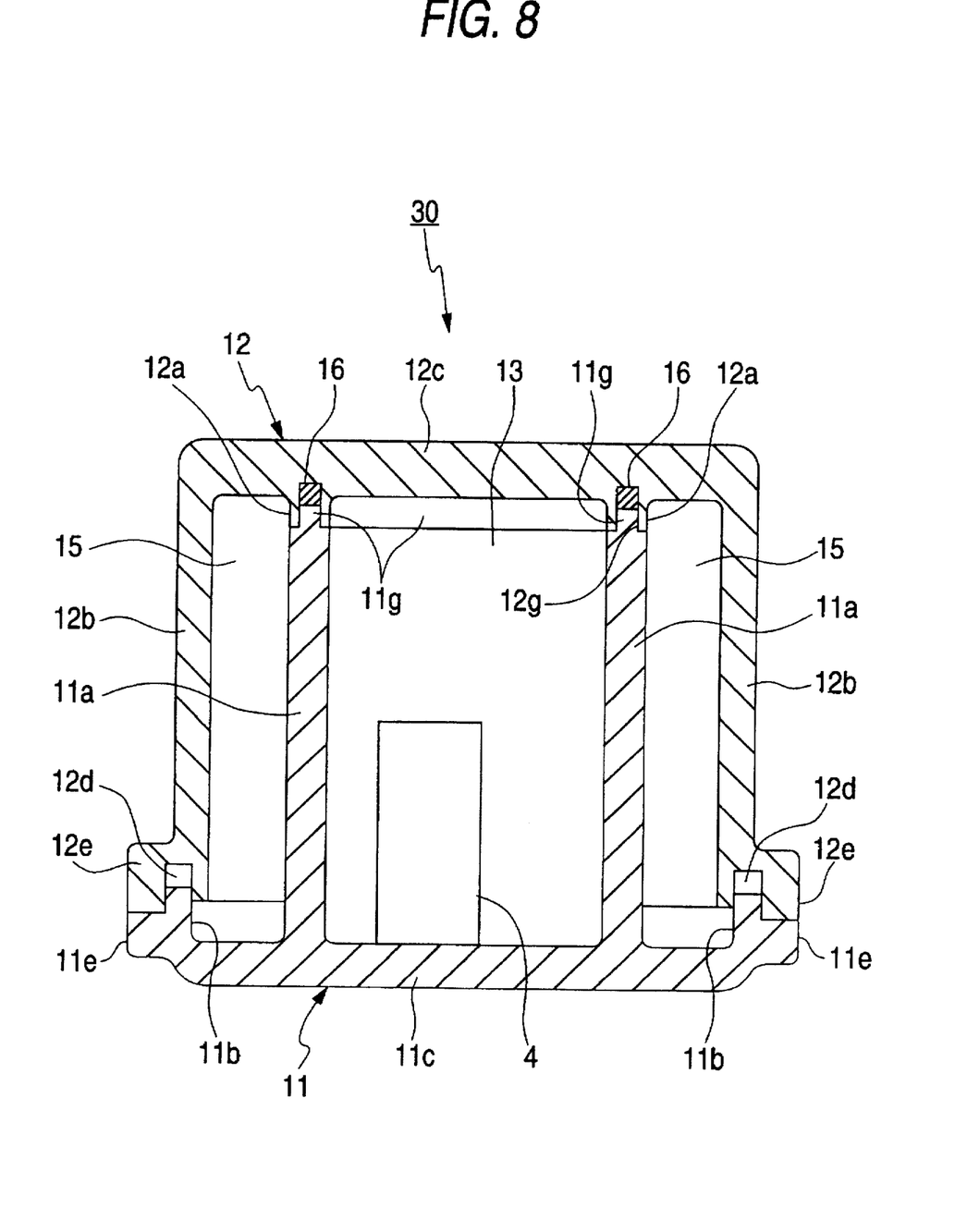
FIG. 8 is a cross-sectional view of the casing of FIG. 7 in its assembled condition.

FIGS. 1 to 8 show preferred embodiments of the waterproof casing of the present invention, and more specifically FIG. 1 is a partly-broken, perspective view of a first embodiment of the waterproof casing of the invention, FIG. 2 is a cross-sectional view taken along line A—A indicated in FIG. 1, FIG. 3 is an enlarged view of a portion B indicated in FIG. 2, FIG. 4 is an enlarged view of a portion C indicated in FIG. 2, FIG. 5 is a cross-sectional view of a portion of a second embodiment of the waterproof casing of the invention, FIG. 6 is a cross-sectional view of a portion of a third embodiment of the invention, FIG. 7 is a partly-broken, exploded perspective view of a fourth embodiment of the invention, and FIG. 8 is a cross-sectional view of the casing of FIG. 7 in its assembled condition.

The waterproof casing 10 of the first embodiment of the invention shown in FIGS. 1 and 2 is used for mounting electrical parts 4, such as a fuse and a relay, in an engine room of an automobile. This casing 10 comprises a casing body 11 having a substantial box-shape, and a lid 12 for openably closing an open portion (open top) of the casing body 11. The casing body 11 and the lid 12 jointly define a receiving space 13 for holding or containing the electrical parts 4 and the like. Distal ends of peripheral wall portions of the casing body 11 and the lid 12 are butted against each other to provide a joint portion which is waterproof, thereby preventing water or the lake from intruding into the receiving space 13.

The casing body 11 and the lid 12 have respective first peripheral walls 11a and 12a butted against each other at their distal ends to thereby prevent the intrusion of water into the receiving space 13, and the casing body 11 and the lid 12 also have respective second peripheral walls 11b and 12b which are spaced outwardly from the first peripheral walls 11a and 12a to form a space 15 around the first peripheral walls 11a and 12a, and are butted against each other at their distal ends. The joint portion between the first peripheral walls 11a and 12a, as well as the joint portion between the second peripheral walls 11b and 12b, limits the intrusion of water, and thus the two joint portions jointly constitute a double waterproof structure.

The first peripheral wall 11a and the second peripheral wall 11b are formed upright on a bottom wall 11c of the casing body 11 over an entire peripheral portion thereof, and the two peripheral walls 11a and 11b serve as side walls. The first peripheral wall 12a and the second peripheral wall 12b are formed perpendicularly on a top wall 12c of the lid 12 over an entire peripheral portion thereof, and the two peripheral walls 12a and 12b also serve as side walls.

As shown in FIG. 3, the distal end portion of the second peripheral wall 11b of the casing body 11 has a projected edge portion 11d projecting toward the lid 12, and a flange 11e extending in a direction of the thickness of the peripheral wall 11b at a region adjacent to the projected edge portion 11d so as to receive the distal end of the peripheral wall 12b of the lid 12. On the other hand, a groove 12d for receiving the projected edge portion 11d is formed in the distal end portion of the second peripheral wall 12b of the lid 12. An outer distal end wall 12e, forming the groove 12d, is held in intimate contact with the flange 11e of the projected edge portion 11d, thereby achieving a waterproof effect.

As shown in FIG. 4, a projection 11g in the form of a thin sheet is formed upright on the distal end of the first peripheral wall 11a of the casing body 11, and is disposed centrally of the thickness of the peripheral well 11a. A groove 12g for fitting on the projection 11g is formed in the distal end of the first peripheral wall 12a of the lid 12. The depth of this groove 12g is greater than the length of projecting of the projection 11g, and a packing 16, made of synthetic rubber or the like, is mounted in an inner bottom or end of the groove 12g. Therefore, the projection 11g and the inner bottom of the groove 12g are held in intimate contact with each other through the packing 16, thereby achieving a high waterproof effect.

As shown in FIG. 2, the position $H_2$ of the joint portion between the first peripheral walls 11a and 12a is higher than the position $H_i$ of the joint portion between the second peripheral walls 11b and 12b so that water, intruded through the joint portion between the second peripheral walls 11b and 12b, will not splash the joint portion between the first peripheral walls 11a and 12a.

As described above, the waterproof structure of the joint portion between the second peripheral walls 11b and 12b does not employ any packing, and hence is simpler in construction than the waterproof structure of the joint portion between first peripheral walls 11a and 12a.

Drain holes 18 for discharging the intruded water from the space 15 (which is formed around the first peripheral walls 11a and 12a when the first peripheral walls 11a and 12a, as well as the second peripheral walls 11b and 12b, are butted against each-other) are formed through the bottom wall of the space 15 at suitable portions thereof.

In the waterproof casing 10 of the first embodiment, the second peripheral walls 11b and 12b of the casing body 11 and the lid 12 are butted against each other, and also their first peripheral walls 11a and 12a are butted against each other, thus forming the double waterproof structure. Besides, the space 15 is formed between the two waterproof structures around the first peripheral walls 11a and 12a of the casing body 11 and the lid 12. This space 15 serves as a liquid-collecting space having a large capacity, and because of the provision of this large-capacity space 15 and the drain holes 18, water is prevented from being filled in the space 15, and can be rapidly discharged to the exterior of the waterproof casing 10.

Furthermore, water, passed through the joint portion between the second peripheral walls 11b and 12b, is reduced in pressure, and is prevented from directly splashing the first peripheral walls 11a and 12a.

Namely, the second peripheral walls 11b and 12b particularly serve to greatly reduce the pressure of high-pressure water stream acting on the joint portion between the casing body 11 and the lid 12, and also serve to suppress the intrusion of the water into the liquid-collecting space 15. The liquid-collecting space 15 spaces the first peripheral walls 11a and 12a from the second peripheral walls 11b and 12b so that low-pressure water, passed through the joint portion between the second peripheral walls 11b and 12b, will not reach the first peripheral walls 11a and 12a, end the liquid-collecting space 15 also serves to rapidly discharge the intruded water from the casing. The first peripheral walls 11a and 12a positively prevent the low-pressure water from passing beyond the liquid-collecting space 15.

Therefore, the intrusion of water into the receiving space 13, formed by the casing body 11 and the lid 12, is positively prevented, and the electrical parts 14, received in this receiving space 13, are positively prevented from being stained and damaged by such intruded water.

Besides, the waterproof structure of the joint portion between the second peripheral walls 11b and 12b is simpler in construction than the waterproof structure of the joint portion between the first peripheral walls 11a and 12a, and therefore the manufacturing cost can be reduced.

The position of the joint portion between the first peripheral walls 11a and 12a is higher than the position of the joint portion between the second peripheral walls 11b and 12b, and water, intruded through the joint portion between the second peripheral walls 11b and 12b, hardly splashes the joint portion between the first peripheral walls 11a and 12a, and this further enhances the waterproof performance.

In the above first embodiment, because of the provision of the packing 16, the first peripheral walls 11a and 12a are larger in thickness than the second peripheral walls 11b and 12b. Therefore, if it is desired to obtain a lightweight construction with a thin-wall design, first peripheral walls 11a and 12a may be made hollow by respective narrow grooves 11h and 12h as shown in the second embodiment of FIG. 5.

FIG. 6 shows the third embodiment in which in a waterproof structure for an insertion portion of a wire harness, a bushing 19 for passing the wire harness therethrough extends through a joint portion between first peripheral walls 11a and 12a and a joint portion between second peripheral walls 11b and 12b, flange portions 20 are fumed on the bushing 19, and are adapted to be held between the first peripheral walls 11a and 12a and between the second peripheral walls 11b and 12b, respectively. The flange portions 20 serve as packings.

The fourth embodiment of the waterproof casing of the invention will now be described with reference to FIGS. 7 and 8. The waterproof casing 30 of the fourth embodiment differs from the waterproof casing 10 of the first embodiment in that the joint portion between second peripheral walls 11b and 12b is disposed at a low position adjacent to a bottom wall 11c of a casing body 11 while the joint portion between first peripheral walls 11a and 12a is disposed at a high position adjacent to a top wall 12c of a lid 12. Therefore, those portions of FIGS. 7 and 8 for the same purposes as those of identical or corresponding portions of FIGS. 1 to 4 are designated by identical reference numerals, respectively, and explanation of the construction and operation of those portions will be omitted.

In this fourth embodiment, the first peripheral wall 11a is formed on the bottom wall 11c of the casing body 11, and the second peripheral wall 11b is merely formed lightly on the bottom wall 11c. Also, the second peripheral wall 12b is formed on the top wall 12c of the lid 12, and the first peripheral wall 12a is merely formed slightly on the top wall 12c.

Thus, the casing body 11, as well as the lid 12, can be regarded as having a single wall construction, and therefore the casing body and the lid can be molded easily, thereby enhancing the productivity, and besides the precision of working can be naturally enhanced, so that the reliability is enhanced.

The waterproof casing of the present invention is not limited to the purpose for mounting the electrical parts in an engine room of an automobile, but can be used for various daily purposes.

As described above, in the waterproof casing of the present invention, the casing body and the lid have the respective first peripheral walls butted against each other to thereby prevent the intrusion of water into the receiving space, and also have the respective second peripheral walls which are spaced outwardly from the first peripheral walls to form the space around the first peripheral walls, and are butted against each other, so that the joint portion between the first peripheral walls, as well as the joint portion between the second peripheral walls, forms a waterproof structure which limits the intrusion of water.

With this construction, even if a water stream of high pressure acts on the joint portion between the second peripheral walls of the casing body and the lid, the intrusion of the water into the receiving space is positively prevented, and the electrical parts or the like received in this receiving space is positively presented from being stained and damaged by water.

The position of the joint portion between the second peripheral walls is offset from the position of the joint portion between the first peripheral walls. With this construction, the splashing of the water, intruded through the joint portion between the second peripheral walls, onto the joint portion between the first peripheral walls, is suppressed, thereby further enhancing the waterproof effect.

In one example of the invention, the joint portion between the second peripheral walls is disposed at a low position adjacent to the bottom wall of the casing body while the joint portion between the first peripheral walls is disposed at a high position adjacent to the top wall of the lid.

Therefore, the casing body, as well as the lid, can be regarded as having a single wall construction, and therefore the casing body and the lid can be molded easily, thereby enhancing the productivity, and besides the precision of working can be naturally enhanced, so that the reliability is enhanced.

The waterproof structure of the joint portion between the second peripheral walls is simpler in construction than the waterproof structure of the joint portion between the first peripheral walls, and the drain holes for discharging intruded water are formed in the bottom portion of the wall defined by the second peripheral walls.

With this construction, the joint portion between the second peripheral walls is not absolutely required to prevent a high-pressure water stream from passing therethrough, but need only to prevent water from splashing the first peripheral walls, and the intruded water can be rapidly discharged from the casing. The waterproof structure of the joint portion between the second peripheral walls can be simpler than the waterproof structure of the joint portion between the first peripheral walls, and therefore the manufacturing cost can be reduced, and the assembling efficiency can be enhanced.

What is claimed is:

1. A waterproof casing comprising:

a casing body having a substantial box-shape; and a lid for openably closing an open portion of said casing body, said casing body and said lid jointly defining a receiving space for containing electrical parts, wherein said casing body and said lid include respective first peripheral walls which are butted against each other to thereby prevent an intrusion of water into the receiving space, and also include respective second peripheral walls which are spaced outwardly from said first peripheral walls to form a space around said first peripheral walls, and are butted against each other, so that each of a joint portion between said first peripheral walls and a joint portion between said second peripheral walls forms a waterproof structure which limits an intrusion of water.

2. The waterproof casing according to claim 1, wherein a first vertical position of the joint portion between said second peripheral walls is vertically offset from a second vertical position of the joint portion between said first peripheral walls so as to prevent water intruded through the joint portion between said second peripheral walls from splashing the joint portion between said first peripheral walls.

3. The waterproof casing according to claim 2, wherein said first vertical position is adjacent a bottom wall of said casing body while said second vertical position is adjacent a top wall of said lid.

4. The waterproof casing according to claim 1, wherein a distal end portion of said second peripheral wall of said casing body includes a projected edge portion projecting toward said lid and a flange extending in a thickness direction of said second peripheral wall of said casing at a region adjacent to the projected edge portion so as to receive an edge of said second peripheral wall of said lid, while a distal end portion of said second peripheral wall of said lid includes a groove for receiving the projected edge portion and an outer distal end wall forming the groove which is held in intimate contact with the flange.

5. The waterproof casing according to claim 1, wherein a projection is formed upright on a distal end portion of said first peripheral wall of said casing body, and is disposed centrally of a thickness of said first peripheral wall of said casing, and a groove for fitting on the projection is formed in a distal end portion of said first peripheral wall of said lid, and wherein a thickness of said projection is less than said thickness of said first peripheral wall of said casing.

6. The waterproof casing according to claim 5, further comprising a packing mounted in the groove formed in the distal end portion of said first peripheral wall of said lid.

7. The waterproof casing according to claim 6, wherein said first peripheral walls of said casing body and said lid are hollow.

8. The waterproof casing according to claim 1, wherein a drain hole for discharging intruded water is formed in a bottom portion of said second peripheral wall of said casing body.

* * * * *